C. G. WILSON.
Cotton-Seed Planter and Guano-Distributor
No. 133,911. Patented Dec. 10, 1872.
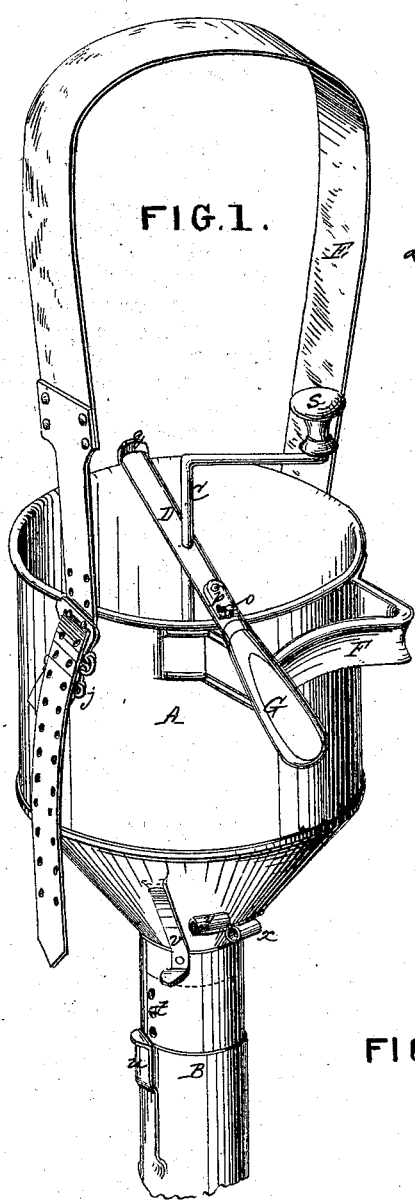
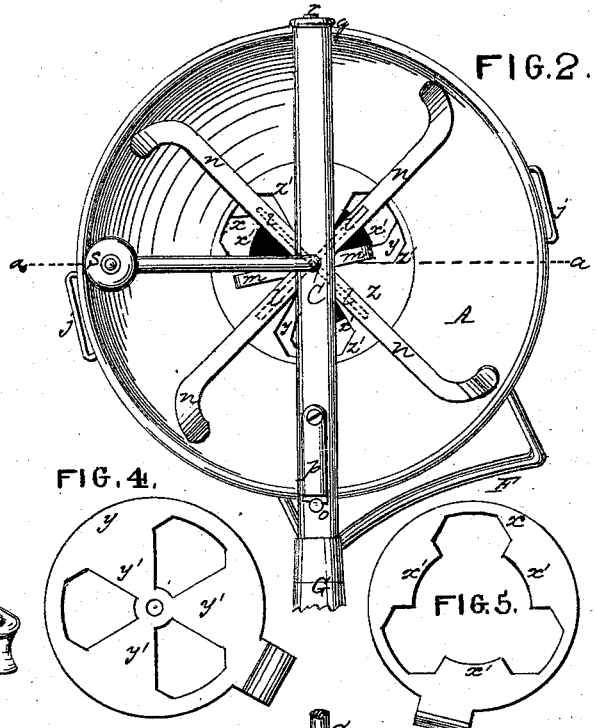
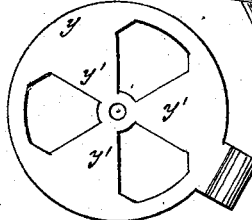
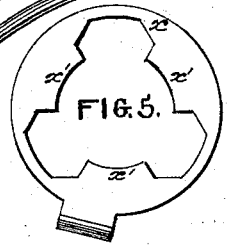
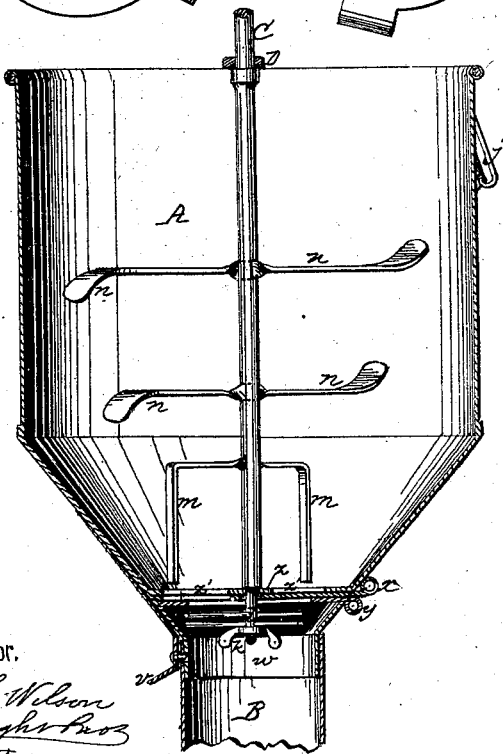
Witnesses
Jas. L. Ewin
Walter Allen
Inventor.
Carlos G. Wilson
By Knight Bros
Attorneys

UNITED STATES PATENT OFFICE.

CARLOS G. WILSON, OF MILLEDGEVILLE, GEORGIA.

IMPROVEMENT IN COTTON-SEED PLANTERS AND GUANO-DISTRIBUTERS.

Specification forming part of Letters Patent No. 133,911, dated December 10, 1872.

*To all whom it may concern:*

Be it known that I, CARLOS G. WILSON, of Milledgeville, in the county of Baldwin and State of Georgia, have invented a certain Cotton-Seed Planter and Guano-Distributer, of which the following is a specification:

Nature and Objects of Invention.

The invention relates to that class of mechanical sowers which are carried by the operator. The present apparatus is adapted to be held convenient to the right hand by means of a strap suspending it from the left shoulder and a steadying-handle grasped by the left hand. A guard holds the apparatus from interfering contact with the person. The seed or guano is loosened and discharged by means of a peculiar combination of arms on a vertical shaft rotated by means of a hand-crank. An extension spout, adjustable to suit the operator, conducts the seed or fertilizer into the furrow. A pair of registers serve to properly adjust the discharge-opening to regulate the discharge of the particular materials with which the sower is used. The invention consists in the peculiar construction of the sower above referred to, as hereinafter more fully set forth.

Description of the Drawing.

Figure 1 is a perspective view of a cotton-seed planter and guano-distributer, illustrating the invention. Fig. 2 is a plan view of the same. Fig. 3 is a longitudinal section on the line $a$, Fig. 2. Figs. 4 and 5 are plan views of a pair of register-slides forming part of the apparatus.

General Description.

The cotton-seed or guano is carried in a "bucket" or hopper, A, made of sheet metal, and of cylindrical shape, with an open top and a conical bottom for converging the seed to central discharge-opening $z'$, the latter being formed radially in a small circular plate, $z$. Beneath this bottom plate is arranged a pair of register-slides, $y$ $x$, with handles, by which to rotate them, projecting through a slot in the hopper. The shape of these slides is illustrated in Figs. 4 and 5. The first slide $y$ serves, by lands $y'$, to diminish the width of the radial discharge-openings $z'$, or to entirely close the same. This is sufficient in planting unrolled cotton-seed, when large openings are necessary. But for guano or "rolled seed" a much smaller opening is required, and the discharge-openings, if contracted in width simply to a sufficient extent, would not allow the passage of small lumps, as is necessary. It is desirable, further, to have a central discharge. The circular series of sector-shaped openings is therefore employed in preference to an opening or openings of other shape, and the slide $x$ is provided and adapted, by inward projections $x'$ constituting its "land," to close the outer ends of the discharge-openings, as illustrated in Fig. 2, and thus to obviate any necessity for an objectionable degree of lateral contraction by means of the slide $y$ in adapting the sower to distribute guano or rolled seed. The hopper terminates beneath the register in a neck, $w$, to which a telescopic discharge-spout, B, of two or more sections, is attached by a spring-catch, $v$, and adjustable by means of a catch, $u$, and a series of perforations, $t$, to adapt the sower to the height of the operator. This spout is designed to conduct the seed or guano into the furrow so as to prevent scattering. An axial shaft, C, terminating at top in a hand-crank, $s$, is journaled in the bottom plate $z$ of the hopper, and at its upper end in a cross-bar, D. This cross-bar is attached to the hopper at one end by a pin, $r$, and perforated lug $q$, and at its other end by a latch, $p$, engaging with a notched stud, $o$, so as to be detachable to permit the withdrawal of the shaft. Radial arms $n$ on the shaft C serve to loosen the mass of seed or guano, and to gradually feed it downward. For this purpose one arm of each pair is bent forward and downward at its extremity so as to lift, and the other is bent backward and upward so as to bear down, as illustrated. Beneath these a pair of arms, $m$, projecting radially from the shaft a short distance on opposite sides, and then downward parallel with the shaft, or nearly so, to near the bottom plate, serve to break any large lumps and to assist the discharge. Beneath the register straight radial arms $l$ serve to loosen the seed or guano as discharged, so as to prevent lumping. These may be held by a nut, $k$, so as to be detachable to permit the withdrawal of the shaft by means of its handle. For carrying the sower a strap, E, is attached to loops $j$ on the hopper, so as to pass over the left shoulder; a guard, F, is attached to the hopper to rest against the side, to support the apparatus out of interfering contact with the person; and the bar D is extended to form a handle, G, by which to steady the load. This is grasped by the left hand of the operator.

The suspender E is rendered adjustable to adapt the apparatus for the operator.

The hopper may contain about a peck and a half of seed or guano.

Operation.

The apparatus, being adjusted and filled, is carried by the operator so as to discharge into a furrow, and the crank is turned by the right hand at proper relative speed, which may soon be determined by observation, the effect being varied, if necessary, by means of the register-slide $y$. In planting unrolled seed this slide only is used.

The slide $x$ is used in adapting the apparatus to sow guano or rolled seed.

Should any of the arms become bent, or the apparatus be otherwise impaired, access may readily be had by detaching the tube B and also the shaft C, if necessary, so as to correct the disorder.

Claims.

The following is claimed as new:

1. The loosening and feeding arms $n$, stirrers $m$, and breaking-fingers $l$, formed and arranged substantially as described, in combination with the hopper A and rotary shaft C, for the purposes specified.

2. The telescopic discharge-tube B, constructed with the catch $u$ and perforations $t$, substantially as shown, in combination with the hopper A adapted to be carried in the manner described for adjusting the same for operators of different height, as set forth.

3. The annular register-slide $x$ with inward projections $x'$, in combination with the bottom plate $z$ having radial discharge-openings $z'$, said slide serving to contract the latter from their outer ends inwardly to adapt the apparatus for sowing guano or rolled seed, as set forth.

C. G. WILSON.

Witnesses:
P. L. FAIR,
T. W. WHITE.